United States Patent [19]

DeBruin et al.

[11] 4,253,028
[45] Feb. 24, 1981

[54] DEVICE FOR POSITIONING X-RAY FILMS AND INTENSIFYING SCREENS

[75] Inventors: Frank DeBruin, Krimpen a/d 1 Jssel; Abraham Groeneweg, Ridderkerk, both of Netherlands

[73] Assignee: N.V. Optische Industrie "de Oude Delft", Delft, Netherlands

[21] Appl. No.: 95,636

[22] Filed: Nov. 19, 1979

[30] Foreign Application Priority Data

Nov. 28, 1978 [DE] Fed. Rep. of Germany ....... 2851351

[51] Int. Cl.³ .............................................. G11B 1/00
[52] U.S. Cl. .................................... 250/468; 250/470
[58] Field of Search ...................... 250/468, 469, 470; 271/204, 277

[56] References Cited

U.S. PATENT DOCUMENTS

| | | | |
|---|---|---|---|
| 3,567,931 | 3/1971 | Eelkema | 250/469 |
| 4,199,687 | 4/1980 | Brendl et al. | 250/468 |

FOREIGN PATENT DOCUMENTS

| | | | |
|---|---|---|---|
| 1140064 | 11/1962 | Fed. Rep. of Germany | 250/469 |
| 2112902 | 9/1971 | Fed. Rep. of Germany | 250/469 |

*Primary Examiner*—Alfred E. Smith
*Assistant Examiner*—Carolyn E. Fields

[57] ABSTRACT

A pair of intensifying screens are spread apart to accept X-Ray films and then brought together again with this film sandwiched between them ready to be exposed. The device consists of a deflector and feed channel for deflecting and holding one of the screens spread from the other and a pair of rollers with an endless, continuous band running thereon in a band path having a top and bottom. A grip cleat is mounted to the band parallel to the rollers and grips the pair of intensifying screens along one longitudinal edge. A pressure means has a fixed upper half above the top band path and an upward movable lower half for bringing the screens and film together.

6 Claims, 4 Drawing Figures

DEVICE FOR POSITIONING X-RAY FILMS AND INTENSIFYING SCREENS

BACKGROUND OF THE INVENTION

The invention relates to a device for positioning X-ray films between at least one pair of intensifying screens. The screens are first spread apart to accept the film and then brought together again with the film, ready to be exposed, sandwiched between them. The device consists of two rollers, an endless band, a grip cleat, and a press. At least one of the rollers is powered, and the second is mounted at an interval from and parallel to the first. The grip cleat is mounted parallel to the rollers and on the continuous band so as to grip the pair of intensifying screens along one longitudinal edge. The press forces the intensifying screens and film together.

A device of this kind is known from British Pat. No. 1,490,276. It has the following disadvantages:

(a) It requires two continuous upper and lower bands, and consequently two pairs of rollers.

(b) It is relatively tall, and there is not much space under X-ray tables, because other equipment has to be kept there.

(c) Since X-ray films show shadow images of transilluminated bodies, the farther the surface of the film is from the subject, the greater the undesirable enlargement of the image and the more serious the problem of umbra and penumbra. The exposure position in the known device is at the bottom of the upper band, so that the film-to-subject distance is increased by at least the distance from the top to the bottom of the band.

(d) The press consists of two moving plates, so that more must be spent on mounting them and on controlling and powering their motion.

OBJECT AND STATEMENT OF THE INVENTION

The object of the invention is a device of the type mentioned at the beginning but without the above disadvantages, and cheaper as well.

This object of the invention is to be attained through the following characteristics:

(a) There will be only one pair of rollers, (b) The pair of intensifying screens will be transported by a continuous band from the bottom to the top of the band path.

ADVANTAGEOUSLY, THE INVENTION HAS THE FOLLOWING CHARACTERISTICS (a) The continuous band can transport two different kinds of intensifying-screen pairs. From this it will be evident that it is possible to adapt the invention to different types of X-ray film or exposure or both, just as in manually sandwiching screen to film to screen. Usually, two different kinds are enough. If, however, the band is long enough, three or more different kinds of intensifier screen can be used.

(b) The press consists of two halves. One half is mounted as fixed surface slightly above the top of the band path, and the other movable, below the top of the path and facing upwards toward the upper half. The press is simpler, requires hardly any headroom and permits the pressures employed to be well defined, because of course, the fixed surface is always correctly adjusted.

(c) A deflector feeds the outer screen into the spread position and a feed channel holds it in that position. The characteristics mean that the transport of the outer screen will be well defined and will not need to rely on gravity. Only part of the full force of gravity will be available when the device is not horizontal.

(d) The feed channel has a bend. The bend will prevent the outer screen from curling up as it is being fed back into the spread position, because a bent screen is comparatively rigid.

(e) The device is mounted in a housing that can be moved along guide paths from a loading and unloading position to a film-exposure position and back. The characteristics mean that the device can be transported conveniently from the loading position to the film-exposure position in a manner that is in itself known.

DESCRIPTION OF THE DRAWINGS

A preferred embodiment of the invention will now be described. Of the FIGS..

DETAILED DESCRIPTION

Figure 1:
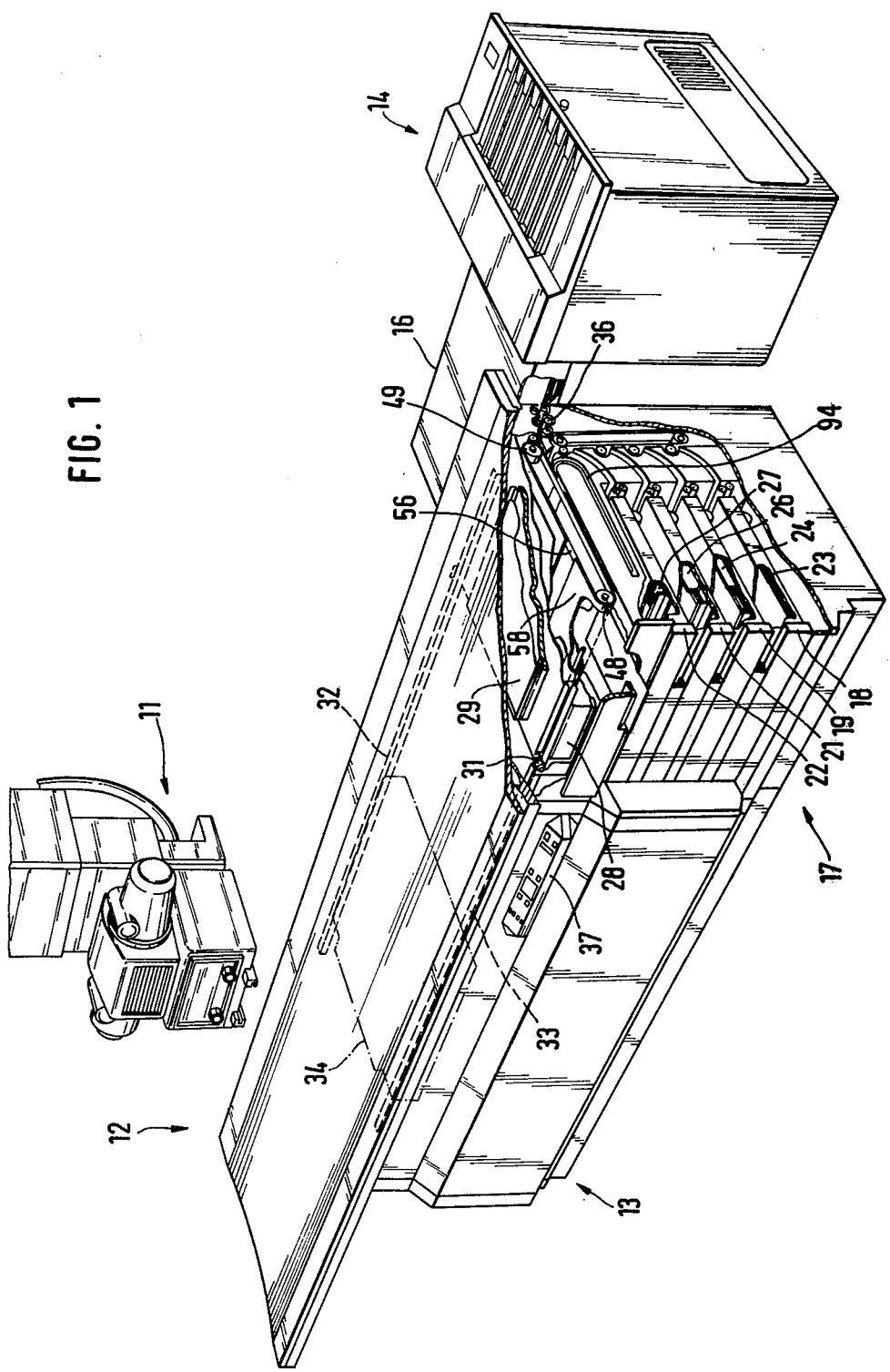
FIG. 1 is a semicutaway perspective view of an X-ray table with a film magazine, a developing box, and the invention built on, FIG. 2 is a schematic side view of the invention.

An examining table 12 is mounted horizontally on a base 13 under an X-ray apparatus 11. A developing box 14 stands at one side of the base and is connected to it by a transport channel 16.

Forward and to the right within base 13 there is a magazine stack 17 with four magazines 18, 19, 21, 22 in which X-ray films 23, 24, 26, 27 are stored. Films 23–27 can be individually transported out from the base and to the right and upwards by transport mechanisms.

A single film 23–27 can be inserted into a device 28 of the type that the invention is intended to be an improvement of. Device 28 is connected to an ionization chamber 29 above it. At the four corners of device 28 are transport rollers 31 that roll back and forth on rails 32, 33 under examining table 12, so that device 28 can be transported to position 34 under X-ray apparatus 11.

After the film has been exposed, device 28 can be transported back to the position shown by the unbroken lines in FIG. 1, and the film can be removed by transport mechanism 36 and transported by way of transport channel 16 into developing box 14. All functions that are not automated can be controlled from a control panel 37.

With the exception of device 28, all of the mechanisms and apparatus described up to this point are known.

Figure 2:
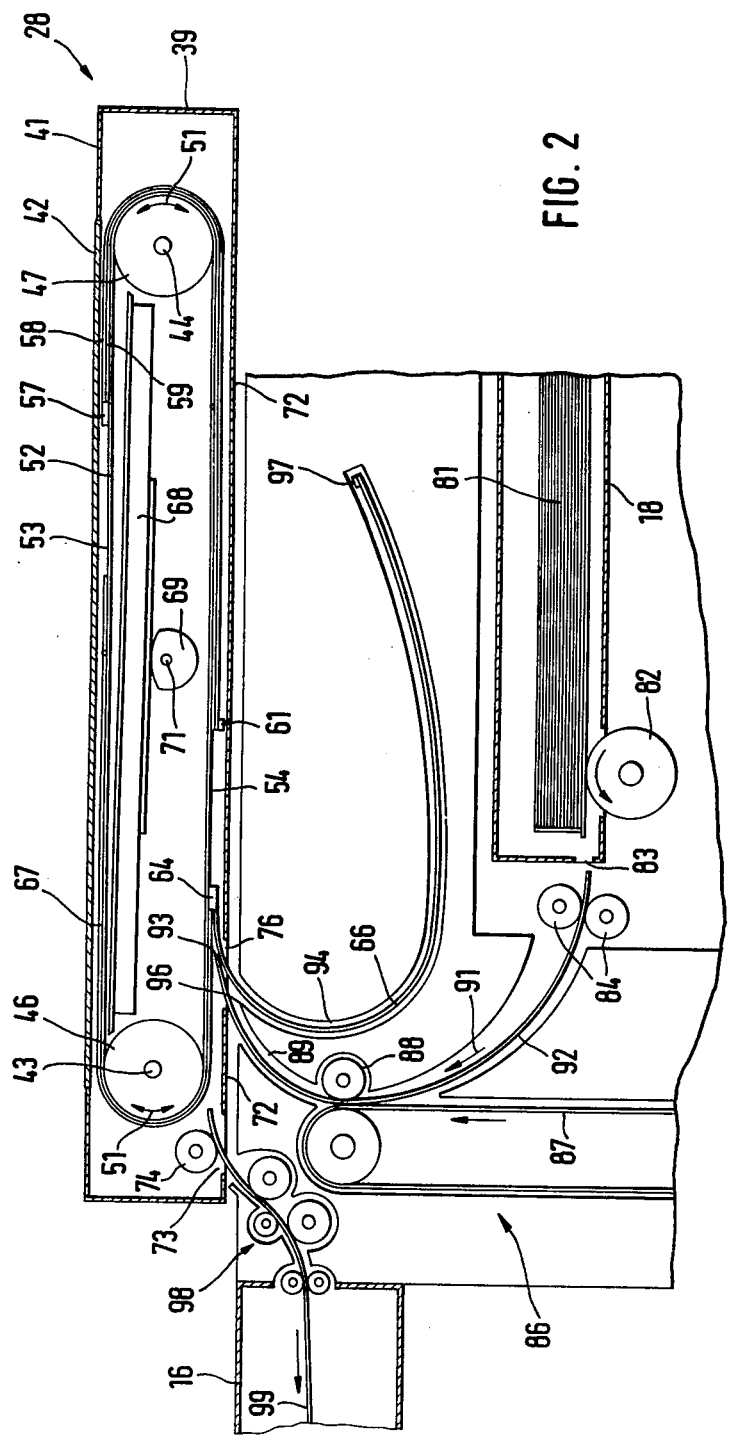

FIG. 2 shows device 28 as seen from the direction of arrow 38 in FIG. 1.

FIG. 2 shows device 28 in a rectangular housing 39. A plate 42 made of an X-Ray transparent material is set into the upper wall 41 of housing 39. Above wall 41 is the shallow ionization chamber, and above the chamber is the examination table 12, neither of which is shown in this drawing.

FIG. 2 shows that there are two transverse shafts 43 and 44 mounted in the housing 39, one on the right and one on the left. Roller wheels 46, 49, and roller wheels 47, 48 are mounted fixed to the ends of shafts 43, 44 respectively so as to rotate with them and form a pair of rollers. Shafts 43, 44 are powered by a drive not shown in the drawings so as to rotate synchronously in one or the other of the directions shown by the double-headed arrow 51.

Continuous band portion 52 runs around roller wheels 46 and 47 in a path that has a top 53 and a bottom 54. A band portion 56 runs similarly around roller wheels 48 and 49 (FIG. 1). Roller wheels 46–49 may be provided with sprockets, in which case band portions 52 and 56 will have corresponding sprocket holes.

The ends of band portions 52 and 56 are joined together by a flat grip cleat 57 mounted on the outside of the band parallel to shafts 43, 44. Cleat 57 is thin enough not to add any essential length to the radius of curvature of rollers 46–49. In the position shown in FIG. 2, cleat 57 securely grips the upper transverse edges of two intensifier screens 58, 59. Intensifier screen 59 lies inside. Its longitudinal edges are firmly connected to band portions 52 and 56, so that screen 59 will conform exactly to the position of band portions 52 and 56.

Intensifying screen 58 has a transverse rod 61 on its transverse area that faces cleat 57. Rod 61 is firmly attached to the outer side of screen 58, and both its ends 62 extend beyond both of the longitudinal edges 63 of screens 58, 59.

Exactly opposite grip cleat 57 on band portions 52 and 56 is another exactly similar grip cleat 64 that grips the two intensifier screens 66, 67 in the same manner, so that screen 67 is also attached to band portions 52 and 56 and is transported by it. Intensifier screens 58, 59, 66, 67 have equal width and length. The length is selected so that there will be an interval along the belt path between the end of one pair of screens 58, 59 and the beginning of the other 66, 67. The same interval will occur between the ends and beginnings of other pairs, as is obvious from FIG. 2. This equivalence of dimension is necessary so that the screens will all lie in the same position at their stopping point, as specified below, no matter what pair is being worked with.

Intensifier screens 66, 67 will be large enough to cover the largest film format both lengthwise and crosswise.

There is a pressure plate 68 under the top 53 of the band path in housing 39. It rests on a cam 69 that is driven around its transverse axis 71 by a mechanism not shown in the drawing. When cam 69 rotates 180° out of the position shown in FIG. 2, it raises pressure plate 68. A locking mechanism not shown in the drawing prevents this from happening except when a pair of intensifier screens lie exactly above pressure plate 68. Such a pair, with the film sandwiched in between, will then be raised flat against the lower surface of plate 42.

There is an output slit 73 on the left in the floor 72 of housing 39. Above this slit is a transverse roller 74 that helps to return the exposed X-ray film. There is a transverse input slit 76 on the right in floor 72 under and near roller 46, 49. It is positioned so that when a pair of screens is being returned, the ends of the screens will be in exactly that position when grip cleat 57 or 64 is exactly under transverse shaft 44 at the bottom 54 of the band path, because that is when the pair of screens with the X-ray film sandwiched in between will be flat but without prestress.

Figure 3:
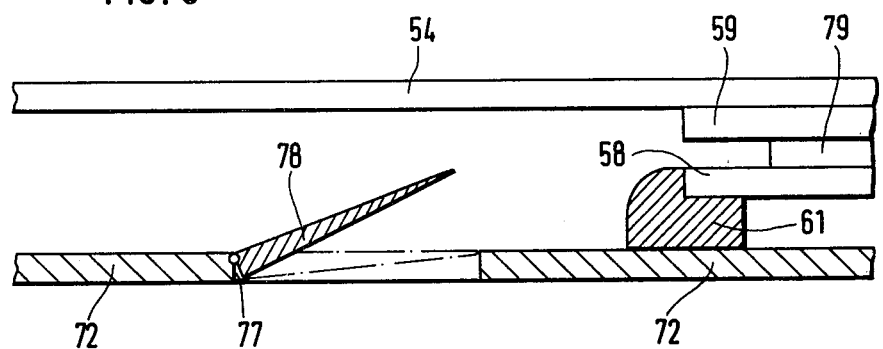
FIG. 3 is a simplified side view of the area surrounding a deflector.
Figure 4:
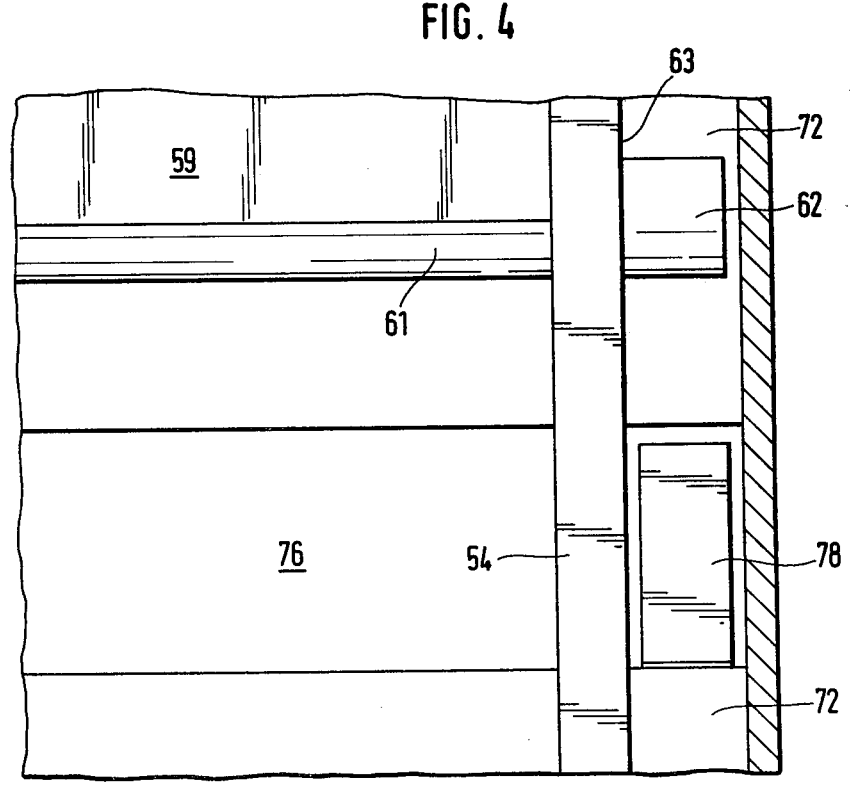
FIG. 4 is a simplified top view of the area shown in FIG. 3.

FIGS. 3 and 4 show a flap 78 that is hinged along its left side in FIG. 3 on the left edge 77 of input slit 76 and on its front and rear ends. When this flap is in the horizontal position shown by the broken lines in FIG. 3, it spans input slit 76 and forms an extension of floor 72.

When folded up and in the position shown by the unbroken lines, it lies in the path of transverse rod 61. When rod 61 moves toward the left in the figure it will be forced downward, followed by intensifier screen 76, and through input slit 76. Since, as is evident from FIG. 4, flaps 78 are to the side of the pairs of screens, it is only screen 58 that will be diverted downward, and screen 59 and film 79 will continue unobstructed to the left until film 79 strikes transverse roller 74, which diverts it down as required.

FIG. 2 includes a schematic representation of one of the magazines, say magazine 18. In the magazine is a stack 81 of X-ray films. One of these films can be transported farther by a pair 84 of cylinders until it strikes continuous band 86, the righthand path 87 of which is moving in the same direction as the arrow, where it is gripped by another cylinder 88 and delivered through a channel 89 that connects at the top with the housing of the device into input slit 76. The transverse edge 93 of film 92 that is being transported in FIG. 2 in the direction of arrow 91 has not yet reached its final position. This position will not be attained until transverse edge 93 strikes against the inside of grip cleat 64. This ensures precise positioning.

Above magazine apparatus 18 is another channel 94 that is not straight. The end 96 of this channel that is upwardly open is directed toward input slit 76. Channel 94 is a guide for outer intensifier screen 66 when screen pair 66, 67 is being used, and intensifier screen 58 when screen pair 58, 59 is being used. If gravity is not strong enough to draw transverse rod 61 or 97 into channel 94, a diverter such as that described in accordance with FIGS. 3 and 4 can be provided at end 96.

Above and to the left of continuous belt 86 is a system 98 of transport cylinders for transporting an exposed film 99 through transport channel 16 to developing box 14.

In contrast to FIG. 2, channel 94 in FIG. 1 is depicted partly straight and horizontal.

The device functions as follows: Housing 39 is initially in the position depicted in FIG. 1. The desired type of screen pair is selected at control panel 37. Let intensifying screens 66, 67 be selected. They will then be in the position shown in FIG. 2. A type of film is also selected and a corresponding X-ray film 92 transported to between intensifying screens 66, 67. If transverse edge 93 has reached the appropriate position, rollers 46–49 will turn counterclockwise as shown in FIG. 2, synchronously with the cylinder pair 84 and continuous band 86. This will continue until grip cleat 64 is above roller 46, 49. Then cam 69 will turn and the screen-film-screen sandwich will be formed. As roller 47, 48 rotates, they force some of the air out of the sandwich. Housing 39 now moves left into position 34 as shown in FIG. 1. After the film as been exposed housing 39 returns by the same route. When rollers 46–49 have returned to the position shown in FIG. 2, they rotate clockwise, screen 66 returns into channel 94, and the exposed film 99 is ejected from the output slit 73.

FIG. 2 thus represents two simultaneous stages of the process.

If, however, intensifying screens 58, 59 are selected, flap 78 must be positioned so that it is not transverse rod 97 but transverse rod 61 that is deflected downwards. Programs of this type are easy to program with microprocessors.

A completely solid band may also be employed instead of band portions 52, 56.

Instead of making band portions 52, 56 continuous, it is also possible to employ short segments that span the spaces between screen pairs and also employ the edges of the screens 59, 67 as bands themselves.

We claim:

1. A device for positioning X-Ray films between at least one pair of intensifying screens in which the screens are first spread apart to accept the film and then brought together again with the film, ready to be exposed, sandwiched between them, comprising:

A single pair of rollers, at least one of the rollers being powered and spaced at a distance and parallel to the other roller, A continuous flexible band running around the pair of rollers in a band path having a top and a bottom, A pair of intensifying screens transported by the continuous band from the bottom to the top of the band path, A grip cleat mounted on the band parallel to the rollers so as to grip the pair of intensifying screens along one longitudinal edge thereof, and Pressure means for bringing the intensifying screens and film together.

2. The device according to claim 1 wherein the continuous band is arranged to transport two different kinds of pairs of intensifying screens.

3. The device according to claim 1 wherein the pressure means comprises a first half mounted as a fixed surface slightly above the top of the band path and a movable second half mounted below the top of the band path and facing upwards towards the first half.

4. A device according to claim 1 comprising means for deflecting the outer screen of the pair of intensifying screens into the spread position and a feed channel for receiving the deflected outer screen and holding it in the spread position.

5. A device according to claim 4 in which the feed channel has a bend in it.

6. A device according to claim 1 comprising a housing for holding the device, and being movable along guide paths between a loading/unloading position and a film exposure position.

* * * * *